Feb. 9, 1965    S. A. OAKLEY    3,169,182
WELD BOX
Filed Feb. 28, 1962    5 Sheets-Sheet 5
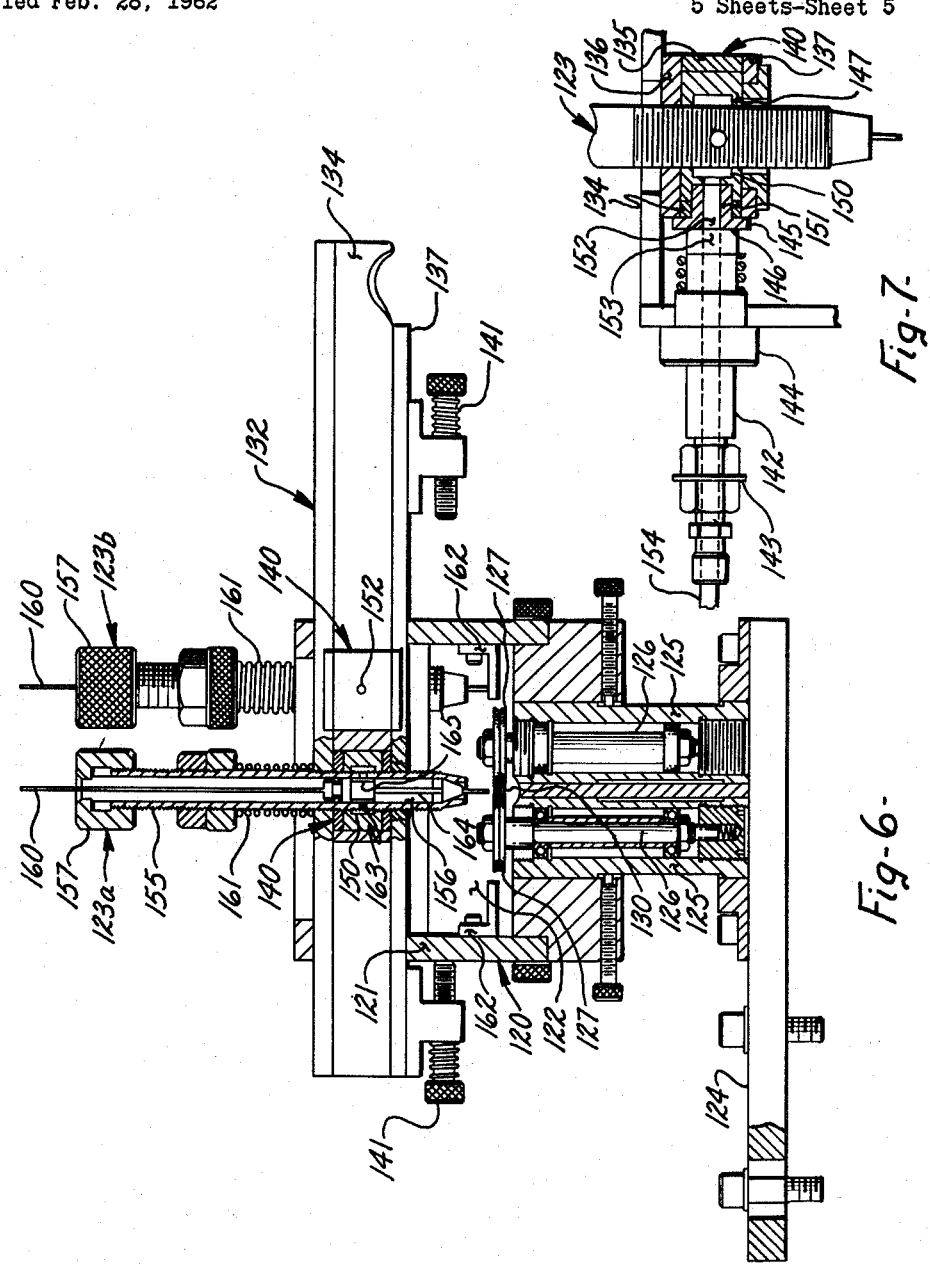
Fig-6-
Fig-7-
INVENTOR.
STERLING A. OAKLEY
BY
Mason, Kolehmainen
Rathburn & Wyss
Attys:

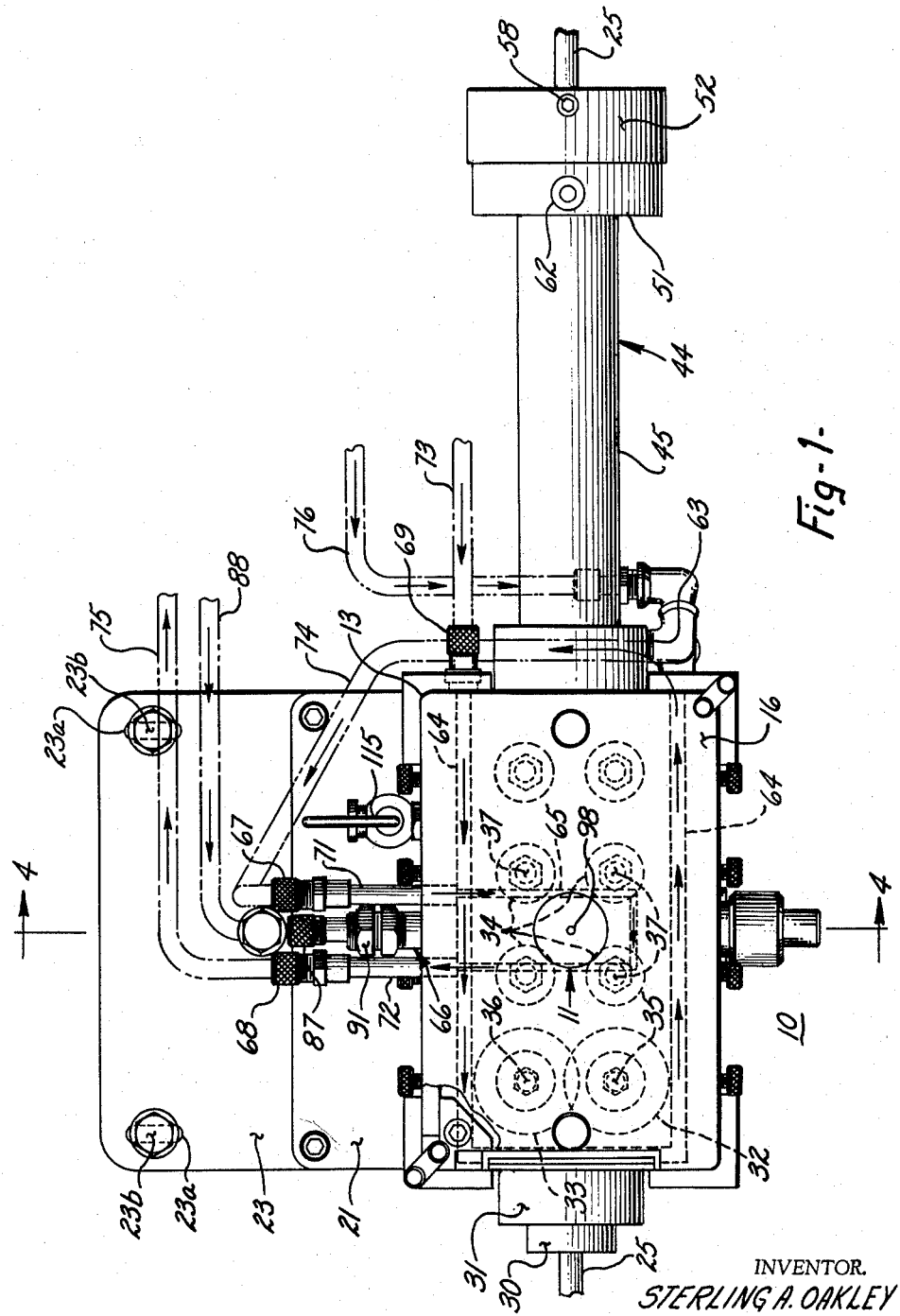

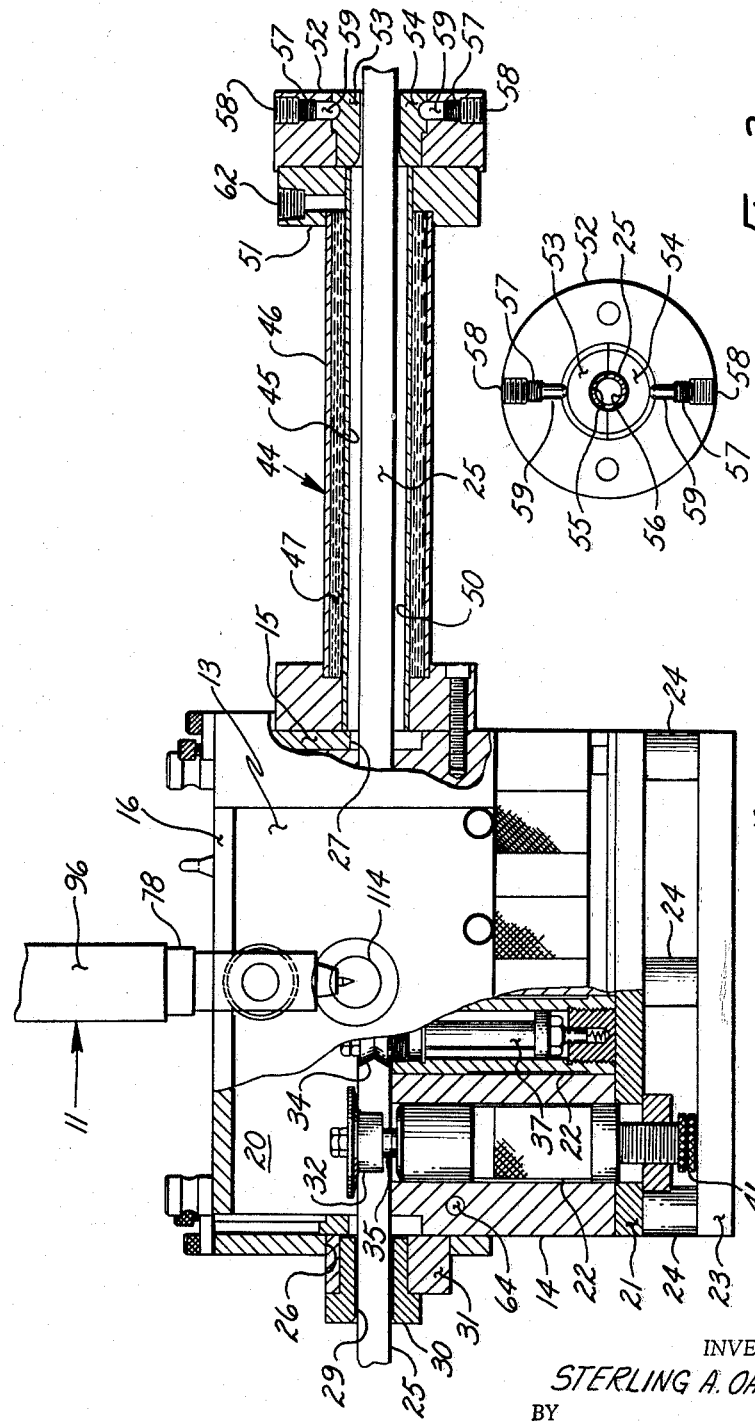

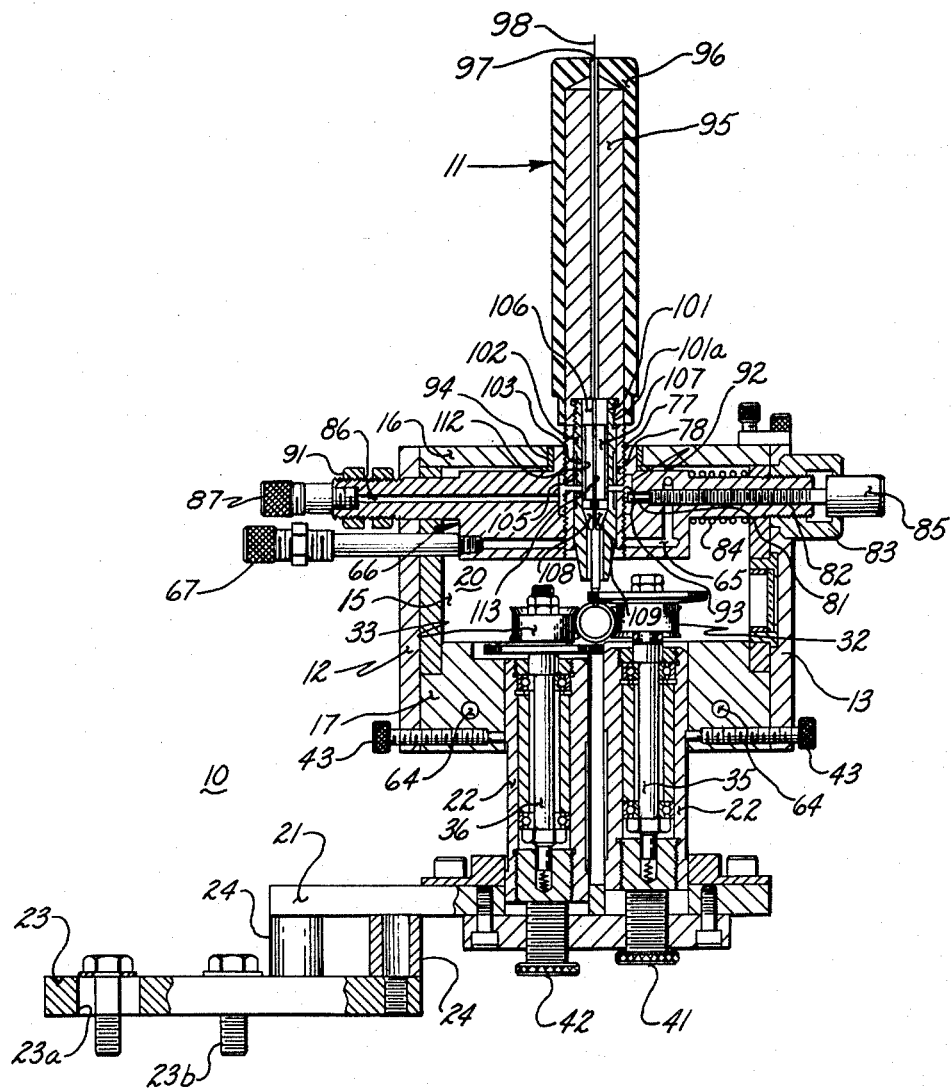
Fig-4-

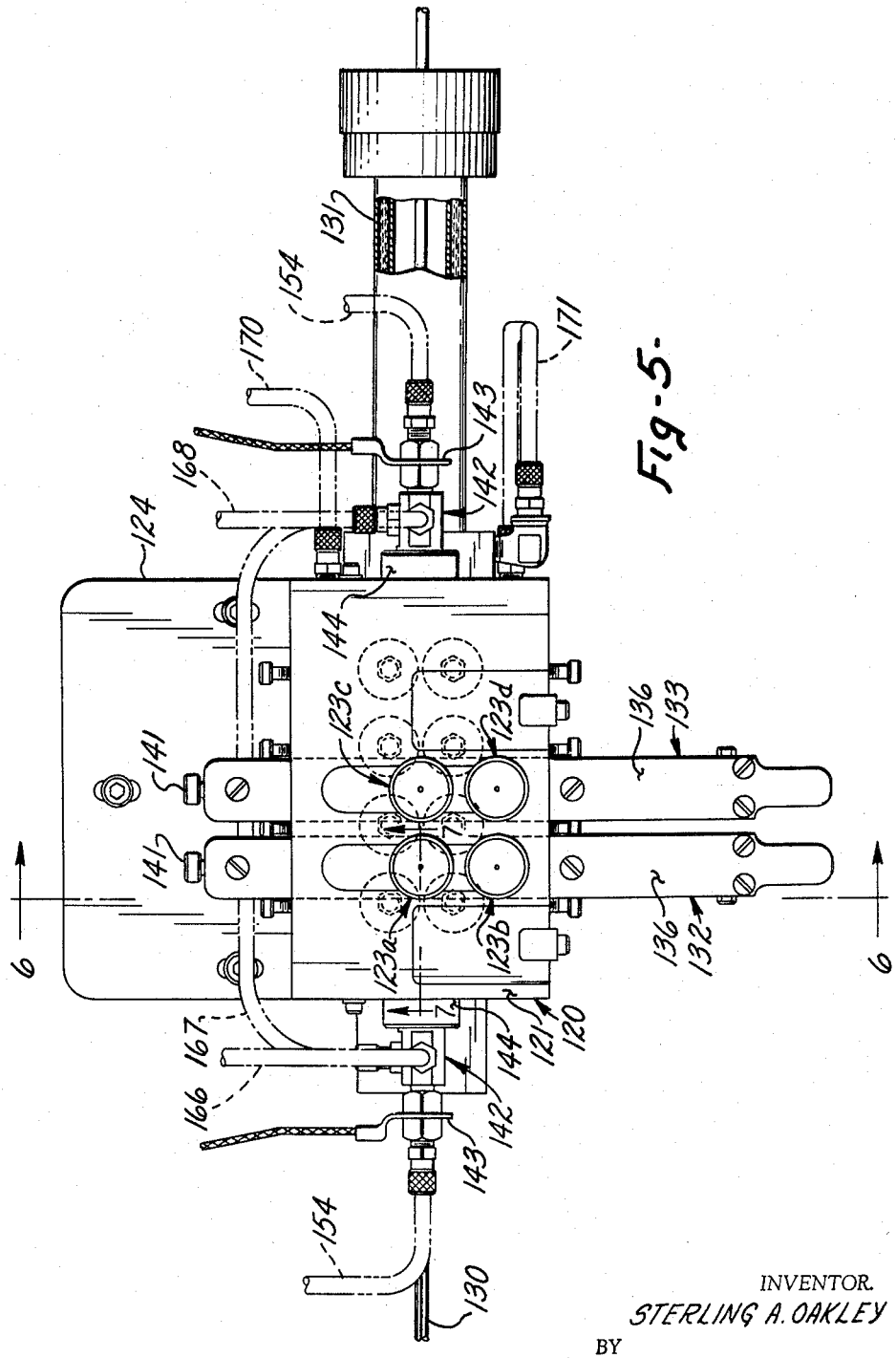

United States Patent Office 3,169,182
Patented Feb. 9, 1965

3,169,182
WELD BOX
Sterling A. Oakley, Lincolnwood, Ill., assignor to Oakley Industries Incorporated, Skokie, Ill., a corporation of Illinois
Filed Feb. 28, 1962, Ser. No. 176,192
9 Claims. (Cl. 219—60)

The present invention relates to a weld box and, more particularly, to a gas-saving weld box provided with readily changeable electrodes and useful in connection with the welding of seams in metal tubing. The present invention is an improvement over the gas-saving weld box disclosed and claimed in my earlier Patent No. 2,788,430, granted April 9, 1957.

Welded tubing extensively used today is constructed of a rectangular sheet of metal which is formed into a cylinder and welded along the abutting edges thereof to form a longitudinally welded seam. For convenience in explaining the invention and to facilitate an understanding thereof, the present invention is described in connection with the manufacture of sheaths for heating elements of the type commonly used in electric ranges, electric flat-irons, electric cooking vessels, electric dryers and the like. Sheathed heating elements of this type comprise an outer metal sheath which houses therein a helical resistance wire. Many sheaths are commonly formed from a high nickel chromium alloy. Some such alloys are more fully described in my above-mentioned patent.

Such sheaths are commonly formed from flat strip material formed by suitable forming rollers into the desired tubular shape. This results in tubing with an open seam, and it is necessary to close the seam in the tubing thus formed, which is commonly done by a seam-welding process. One such welding process satisfactory for this purpose employs an electric arc welding circuit. The electric arc welding circuit will include a welding electrode which generally is held fixed and the tubular formed strip material is continuously moved past the welding electrode with the seam thereof in proper oriented position to weld the abutting edges of the sheet material. In one such tube welding apparatus, the formed tubing was moved continuously at a rate of four hundred to five hundred inches per minute past the welding electrode. Since the welding electrode is consumed during the welding process and occasionally requires replacement, there is a significant length of tubing which passes through the welding device during the changing of the electrodes which is not closed in the welding process. In the above-mentioned device wherein the tubing is passing at the rate of four hundred to five hundred inches per minute, each electrode change would result in, for example, fifteen feet of tubing passing through the device which is not welded. This results in a very appreciable annual rate of scrap. Additionally, the welding process which has been found satisfactory for this purpose employs a gas-shielded arc. To provide a gas-shielded arc has required extensive quantities of inert gases, such as helium or argon, both of which are relatively expensive. In my above-mentioned prior patent, there is disclosed a gas-saving weld box which provides a gas-shielded welding process in which the amount of shielding gas employed is cut down over prior welding processes without impairing the welding operation. As therein disclosed, the gas-saving weld box includes a housing within which the seam of seamed tubing is welded in a manner greatly to cut down the quantity of arc-shielding gas employed in the welding operation. Means are provided to confine the gas supplied to the welding zone. Simple means are also provided to insure that the welded seam is properly held until the molten seam is sufficiently cool to insure that no change in shape will occur. Means for rapidly cooling the welding tubing are also provided in connection with the weld box. The welding electrode generally comprises a tungsten element held in a conductive electrode tube or holder which is both an electric welding current conductor and a gas conduit through which the inert shielding gas is supplied. Obviously, the electrode holder must be connected to a suitable source of welding current and also to a source of shielding gas. When an electrode holder of conventional design is employed with the above-mentioned gas box, difficulty is encountered in the loss of gas during the periodic replacement of the electrodes. Such escape of gas from the gas-saving weld box requires a bleeding of the air from the welding box upon resumption of the welding operation. All of these factors contribute to the delay in re-establishing the welding operation so that a significant amount of tubing passes through the weld box while the electrode is being changed.

Accordingly, it is an object of the present invention to provide an improved apparatus for welding with a gas-shielded arc which greatly reduces the amount of time necessary to change the welding electrode thereof.

It is a further object of the present invention to provide a new and improved weld box employing a gas-shielded welding process.

It is another object of the present invention to provide a new and improved electrode holder for a gas-saving weld box.

It is yet another object of the present invention to provide a new and improved welding apparatus enabling a rapid change of welding electrodes.

A further object of the present invention is to provide a new and improved weld box which permits the replacement of the welding electrode without allowing the escape of an unreasonably large amount of arc-shielding gas.

A further object of the present invention is to provide a new and improved weld box, which permits the rapid replacement of welding electrodes so that the amount of unwelded tubing passing through the device during the changing of the electrodes is reduced to a minimum.

For a better understanding of the present invention, reference may be had to the accompanying drawings, in which:

FIG. 1 is a plan view of an improved weld box according to the present invention;

FIG. 2 is a front elevational view partly in section, of the improved weld box of FIG. 1;

FIG. 3 is a fragmentary right end view of the weld box of FIG. 1;

FIG. 4 is a side sectional view of the weld box of FIG. 1, taken substantially along line 4—4 of FIG. 1;

FIG. 5 is a plan view of a modified weld box employing the principles of the present invention;

FIG. 6 is a side elevational view, in section, of the modified weld box illustrated in FIG. 5, and taken along line 6—6 of FIG. 5; and FIG. 7 is a fragmentary view illustrating the connection of the gas supply and welding circuit to the electrode holder in the embodiment of FIG. 5.

Briefly, the present invention is directed to a gas-saving weld box for use in closing the seam in seamed tubing wherein the welding electrode may be quickly and rapidly replaced so that a minimum length of tubing passes unwelded through the weld box during the replacement of the electrode and the electrode replacement is accomplished without the escape of an excessive amount of arc-shielding inert gas, so that the welding operation may be resumed without bleeding the air from the welding box. The welding operation takes place in a closed welding chamber wherein the seamed tubing to be welded is continuously passed through aligned openings in the opposed walls in the chamber. A welding electrode carried by an electric holder passes through the wall of the chamber in welding relation with the seam of the tubing. An inert atmosphere is maintained in the chamber and particularly in the welding zone thereof. In order to provide the inert gas to the welding area, a passageway is provided in the electrode holder with openings near the end of the electrode and the passageway is adapted to be connected with a source of inert gas.

In accordance with the present invention, the electrode holder is quickly movable into a welding position permitting a new electrode to be rapidly inserted into the welding circuit so that the length of tubing which passes through the welding box during the electrode changing process is minimized. In a preferred embodiment of the present invention, the electrode holder is an elongated member having an electrode holding collet at one end and adapted to hold an electrode passing therethrough. The electrode holder is provided with a nozzle which is slidably receivable in an adjustable sleeve to align the electrode holder and, consequently, the welding electrode, in welding position with the seamed tubing. The adjustable sleeve is provided with a plurality of radial openings which communicate with a manifold connected to a source of inert gas. Moreover the nozzle is provided with an annular recess communicating with the openings in the sleeve and further communicating to direct the inert gas to the welding zone. The electrode holder is quickly removable from the weld box by mere lifting of the holder out of the adjustable sleeve, and a second electrode holder, having an electrode adjusted therein, may be rapidly inserted in place of the removed electrode into welding position in the weld box. In this manner, the electrode holder, and, consequently, the electrode is quickly replaced and a new electrode is moved into welding position with a minimum loss of seamed tubing.

In a further embodiment of the present invention, a pair of electrode holders are positioned on a slidable electrode turret so that one electrode may at all times be in welding position while another electrode is being inserted into the other electrode holder.

According to yet another feature of the present invention, there may be employed a pair of serially operating electrodes, a first one of which is a preheat electrode and the second one of which is the welding electrode.

Referring now to the drawings, there is illustrated in FIGS. 1 through 4 a welding box generally designated by the reference numeral 10 and provided with an electrode holder 11 according to the present invention. The welding box 10 comprises a closed housing formed of a rear plate 12, a front plate 13, a pair of side plates 14 and 15, a top plate 16, and a lower wall 17 which cooperate to form a closed welding chamber 20. The lower wall 17 is defined by a plurality of shaft housings 22 supported from a base plate 21 and which, as will become apparent, enclose tube rollers and simultaneously cooperate to define the chamber. The base plate 21 is fixedly spaced from an adjustable mounting plate 23 by a plurality of spacers 24 and the mounting plate 23 is provided with a plurality of elongated mounting holes 23a (FIG. 1) adapted to receive mounting bolts 23b to provide for adjustable mounting of the welding box 10. It has been found that brass is entirely satisfactory for the weld box, although obviously, any other suitable material may be used without departing from the present invention.

For forming the continuous tubing used with the welding box of the present invention, a flat strip of the desired material is formed by a succession of forming rollers (not shown) and is successively converted, first to a somewhat U-shaped form, and then to a substantially closed tubular form shown at 25, with a seam defined between the edges of the strip which has been brought close to abutting relation, as more fully described in my above-mentioned prior patent. The continuous tubing 25, with its open seam extending upwardly passes through the gas-saving weld box 10 of the present invention and, to this end, the walls 14 and 15 of the welding box 10 are provided with aligned openings designated 26 and 27, respectively, whereby the tubing 25 moves therethrough. In order to reduce to a minimum the escape of gas through the opening 26, there is defined an entrance guide 30 held in place in the opening 26 by a sealer plate 31. The entrance guide 30 is provided with an opening 29 for just accommodating the particular tubing size being welded. It will be apparent that tubing of various sizes may be manufactured and the welding box 10 of the present invention is useful in manufacturing tubing of various sizes, the opening 26 being sufficiently large to accommodate the largest tubing to be manufactured. Under these conditions, a separate entrance guide 30 will be provided for each size of tubing to be manufactured.

It will be appreciated that in order to perform a satisfactory seam-closing operation on continuous tubing, the seam must be in a predetermined position. To this end, there is suitably positioned within the chamber 20 a pair of stabilizer rollers 32 and 33 and a plurality of identical pincer rollers 34. The rollers 32, 33, and 34 are all supported on the upper end of shafts 35, 36 and 37, respectively, eccentrically enclosed in respective ones of the shaft housing 22. Rotation of the shaft housings 22 is effective to move the shafts 35 and 36 and pairs of shafts 37 relative to each other to accommodate different sizes of tubing 25. Moreover, the position of the stabilizer rollers 32 and 33 are vertically adjustable through a pair of adjusting screws 41 and 42, FIGS. 2 and 4, to accommodate different sizes of tubing. Pairs of lock nuts 43 engage the shaft housings 22 to lock the housings 22 into the selected adjustable position.

For cooling the welding tubing immediately upon leaving the welding chamber 20, a water cooled chamber assembly 44 is provided extending from the opening 27 of the side plate 15 which assembly is similar to that disclosed in my prior Patent No. 2,788,430. The welded tubing 25 must pass through the water cooled chamber assembly 44. As illustrated, this chamber is defined by a pair of concentric tubes 45 and 46 which form a water jacket 47 between them and have an inner passageway 50 through which the tube 25 passes. The end of the water jacket 47 is closed by an end plate 51 and an adapter 52 of ring shape, including a pair of split bushings 53 and 54, closes the end of the water cooled chamber assembly 44. The bushings 53 and 54 (FIG. 3) each include a substantially semicircular recess 55 and 56, respectively adapted to engage the outer surface of the tube 25 and prevent the escape of inert welding gas from the inner passageway 50. The bushings 53 and 54 are biased against the tubing 25 by a pair of compression springs 57 held in place by respective set screws 58 and bearing against respective pressure pads 59 which, in turn, bias the split bushings 53 and 54 toward each other. The water cooled chamber assembly 44 is provided with a pair of water fittings 62 and 63 (FIG. 1) at opposite ends thereof to provide for the passage of water through the water jacket 47.

In addition to the water cooling of the tubing 25 as it leaves the welding chamber 20, the welding box 10 is water cooled by a plurality of passageways which extend therethrough. Specifically, the lower wall 17 is provided with a water passageway 64 (FIG. 4) and another water passageway 65 extends through a contact block 66 which supports the electrode holder 11. Suitable fittings 67, 68, and 69 (FIG. 1) and suitable adapters 71 and 72 are connected to the end of the passageways 64 and 65 to provide for the connection of water thereto. As best illustrated in FIG. 1, cooling water enters passageway 64 through a waterline illustrated in phantom as 73, passes through the passageway 64, and is discharged from the lower wall 17 into a water line illustrated in phantom at 74, into the fitting 67 and the adapter 71 and through the passageway 65 in the contact block 66, then to be discharged through the adapter 72 and fitting 68 into a water line illustrated in phantom as 75. The water then passes to a control panel (not shown) and thence into the water jacket 47 through a water line illustrated in phantom at 76, then to be discharged from the water fitting 62. As will hereinafter become more apparent, it will be appreciated that the contact block 66 forms one terminal of the electric welding circuit and, accordingly, the water lines 74 and 75 connected to the contact block 66 are of electrical insulating material, such as polyethylene. Similarly, the rear plate 12 and front plate 13, and the top plate 16 of the weld box are formed of electrical insulating material, such as that available under the trade name of "Mykroy," to electrically isolate the contact block 66 from the housing of the welding box.

The electrical welding circuit for the welding box 10 is completed through the contact block 66 which is a generally elongated member provided with a central threaded opening 77 (FIG. 1) extending therethrough for receiving an adjustable sleeve 78. The sleeve 78 is threaded through the opening 77 and is locked in place by an insulator 81 and lock screw 82. Moreover, the contact block 66 is positioned in the chamber 20 by an adjusting nut 83 threaded to one end of the elongated block. A compression spring 84 biases the contact block from the front plate 13 of the welding box 10. The lock screw 82 is provided with a cap 85 extending through the adjusting nut 83 to provide for locking the adjustable sleeve 78 in a preselected position.

To provide for an atmosphere of inert gas in the welding area, the contact block 66 is provided with a gas passageway 86 (FIG. 4) and a gas line fitting 87 communicating with the passageway 86 to provide for the connection of a gas line illustrated in phantom in FIG. 1 as line 88 for supplying an inert gas to the welding area. It will be appreciated that since the contact block 66 forms part of the electrical welding circuit, the gas line 88 is of electrical insulating material, such as polyethylene. Moreover, in order to provide the electrical connection to the contact block 66, there is provided a cable connection 91 on the block 66 which may conveniently be formed as part of the gas passageway 86. The gas passageway 86 communicates with an enlarged recess 92 (FIG. 4) in the opening 77 forming a manifold for the inert gas and the adjustable sleeve 78 is provided with a plurality of radial openings 93 which communicate with the manifold 92 throughout the length of its adjustable travel. To prevent the escape of gas from the chamber 20, a gas seal 94 is provided between the contact block 66 and the top plate 16 of the welding box 10.

The electrode holder 11 is provided with a handle 95 of brass or similar material and covered by a hand grip portion 96 of electrical insulating material. The handle 95 and the hand grip portion 96 are provided with a central opening 97 extending entirely through the electrode holder 11 for receiving a welding electrode 98 of tungsten or other suitable material. A positioning or retaining sleeve 101 has one end 101a thereof threaded into the lower end of the handle 95 and is provided with a finished outer surface 102 providing a close sliding fit with the inner surface of the adjusting sleeve 78. The positioning sleeve 101 contains a recess 103 in its outer surface forming an annular manifold communicating with the radial openings 93 in the adjustable sleeve 78. Moreover, a plurality of radial openings 105 extend through the sleeve 101 from the manifold 103 to provide for the passage of gas through the positioning sleeve 101.

In order to lock the welding electrode 98 in its preselected adjusting position, the electrode holder 11 is provided with a collet 106 which includes a plurality of elongated fingers 107 provided at their lower end with a downwardly extending conical surface 108 in engagement with a complementary conical surface 109 in the positioning sleeve 101. Tightening of the positioning sleeve 101 into the handle 95 is effective to tighten the collet 106 to grip the welding electrode 98 passing therethrough. Moreover, the collet 106 contains a central recessed annular groove 112 communicating with the opening 105 and providing for the passage of inert gas from the passageway 105 through a plurality of radially extending cuts 113 between fingers 107 of the collet 106.

To provide for visual observation of the welding arc, the side wall 13 is provided with a viewing lens 114.

A manually operable exhaust valve 115 (FIG. 1) communicates with the chamber 20 for bleeding of the chamber 20.

From the above-detailed description, the operation of the improved welding device is believed apparent; however, briefly, it will be appreciated that a tube 25 undergoing a seam-welding operation is passed through the welding box 10 at a constant rate, for example, at between a few hundred to about five hundred inches per minute. An inert gas is provided for the welding operation and is supplied to the area of the welding arc through the gas line 88, fitting 87, the gas passageway 86, the manifold 92, the openings 93 in the adjustable sleeve 78, the manifold 103, the opening 105 in the positioning sleeve 101, the annular groove 112 in the collet 106, and the cuts 113 separating the fingers 107. Moreover, the welding box 10 is continuously water-cooled by the water passageways 64 and 65 and the welded tubing 25 is water-cooled in the water cooled chamber assembly 44. An electrical welding circuit is established through the cable connection 91 into the contact block 66, which is electrically insulated from the housing forming the chamber 20, and through the adjusting sleeve 78, positioning sleeve 101, collet 106, and electrode 98, then to form the welding arc with the tubing 25 and grounded through the remaining components including the rollers 32, 33, and 34 and their associated supporting structure. The electrode holder 11 forms a close sliding fit between the inner surface of the adjustable sleeve 78 and the finished outer surface 102 of the positioning sleeve 101. There is provided a plurality of the electrode holders 11 for use with each of the welding boxes 10. When it is desired to change the electrode 98, the electrode holder 11 would be quickly lifted out of the adjustable sleeve 78 and a new electrode holder having a properly adjusted electrode would be quickly slipped into the adjustable sleeve. In this manner the electrode 98 is rapidly moved into welding position and, although the tubing 25 continues to travel through the welding box 10 during the time interval that the electrode holders 11 are being replaced, the new holder 11 is inserted with sufficient speed that the amount of unwelded tubing discharged from the welding box 10 is held to a minimum. The electrode holder 11 is changed so rapidly that the inert gas from the welding box 10 does not escape and it is not necessary to bleed the chamber 20 of air after the welding operation. Moreover, the electrode 98 may be adjusted vertically with reference to the tubing 25 by rotation of the adjustable sleeve 78 which limits the downward movement of the electrode holder 11. The adjustable sleeve 78 is then fixedly held in place by the lock screw 82.

Referring now to the embodiment of FIGS. 5, 6, and 7 of the drawings, there is illustrated a two-stage welding apparatus employing a turret arrangement for providing for quick change of the welding electrodes. As therein illustrated, the welding apparatus includes a welding box generally illustrated at 120 including an enclosed housing 121 forming a welding chamber 122, and additionally including a plurality of electrode holders individually identified as 123a, 123b, 123c, and 123d and collectively referred to as 123. The welding box 120 is supported from a base plate 124 through a plurality of eccentric shaft housings 125 which enclose a plurality of roller shafts 126 provided with appropriate tube supporting rollers 127 at their upper ends. Additionally, the housing 121 is provided with aligned openings in opposite walls thereof to provide for the passage of a tube 130 therethrough, the seam of which is to be welded. Moreover, the welded tubing passes through a water cooled chamber assembly 131 after the welding operation.

In accordance with the present invention, the electrode holders 123 are carried in pairs, 123a and 123b, and 123c and 123d, by a respective one of a pair of turret members 132 and 133. With the tubing 130 passing from the left to the right, as viewed in FIG. 5, the turret member 132, carrying the electrode holders 123a and 123b, serves as a preheat assembly while the turret member 133 carrying electrode holders 123c and 123d serves as a welding assembly.

Each of the turret members 132 and 133 are similar, except for a reversal of parts, so as to be complementary to each other; accordingly, only one of the turret members 132 is herein described in detail. As best illustrated in FIGS. 6 and 7, each of the turret members 132 is substantially of box-shaped cross section being formed with a pair of side plates 134 and 135, a top plate 136 of electrically insulating material, and a bottom plate 137. The turret member 132 is provided with a pair of electrode holder supporting blocks 140, each of which is adapted to receive one of the electrode holders 123a and 123b, respectively. The turret members 132 and 133 are slidably mounted in the housing 123 and are provided with appropriate adjustable stops 141 to provide for movement of the turret members 132 and 133 into a selective one of two positions.

In order to connect an electric welding circuit to the supporting blocks 140 and to supply an inert gas to the welding area, there is provided a pair of electric contact blocks 142, one for each of the turret members 132 and 133. Each of the electric contact blocks 142 is provided with suitable cable connection means 143 for connection to a source of electrical welding current. It will be understood that each of the electric contact blocks 142 is in electrical isolation with the housing 121 and, to this end, passes through an electrical insulating bushing 144 in the side wall of the housing 121. Each of the electric contact blocks 142 is provided with an electrical contact surface 145, FIG. 7, adapted to engage a suitable electrical contact surface 146 in one of the electrode holder supporting blocks 140 and each of the electrode holder supporting blocks 140 is provided with a threaded central aperture 147 for threadedly receiving a respective one of the electrode holders 123. It is understood that each of the electrode holders 123 is in electrical association with its respective support block 140, and electrically isolated from the remainder of the turret member 123.

To provide an atmosphere of inert gas in the welding area of the welding apparatus, each of the electrode holder supporting blocks 140 contains an annular manifold 150 which communicate through a passageway 151 with a source of an inert gas supply 152.

It will be understood that the electrodes 123a and 123b, and the electrodes 123c and 123d, are adapted to be selectively brought into electrical engagement with a respective one of the contact blocks 142 by movement of the turret members 132 and 133 into one of its two limiting positions. In this manner, one of the electrode holders 123a or 123b, and 123c or 123d of each of the pairs of electrodes is at all times in electrical engagement in heating and welding position above the tube 130; the other of the electrode holders in each pair 123a, 123b, and 123c, 123d is isolated electrically from the electrical circuit of the welding apparatus.

In order to provide an atmosphere of inert gas to the welding area in the welding chamber 122, each of the electrode holder supporting blocks 140 is provided with an annular manifold 150 communicating with a passageway 151 to a gas port 152 in the block 140. The ports 152 are adapted to be aligned with gas supply ports 153 in the respective contact blocks 142, which gas supply ports 153 are in communication with a source of inert gas through the gas conduit shown in phantom at 154. In this manner, one of the supporting blocks 140 in each of the turret members 132 and 133 is at all times in gas supply relationship with the source 154 of inert gas.

Each of the electrode holders 123 is identical, and, accordingly, only one is herein described in detail. Each of the electrode holders 123 comprises a sleeve 155 threaded into the threaded central aperture 147 of a respective one of the suporting blocks 140. The electrode holder 123 is provided with a collet 156 connected to a collet adjusting screw 157. An electrode 160 of tungsten or other suitable material extends through the electrode holder 123 and is held in place by the collet 156. The sleeve 155 is adjustable in the aperture 147 and, to secure the sleeve 155 in the selected position, there is provided the compression spring 160 which serves to prevent shaking of the sleeve 155 out of preselected position.

To provide for adjustment of the electrode 160 to the desired length, there is provided an angle or stop member 162 extending into the welding chamber 122 from the housing 121 thereof and positioned to serve as a vertical stop for an electrode 160 when the electrode holder 123 is removed from its welding position; for example, as indicated in FIG. 6, the electrode 160 carried by the electrode holder 123b may be adjusted by positioning it against the stop member 162.

For directing the inert gas supplied in the manifold 150 to the welding area, the sleeve 155 is provided with a plurality of radial passageways 163 which communicate with the manifold 150 and which are further in communication with a plurality of axial recesses 164 in the collet 156 through an annular recess 165 in the collet 156. In this manner, the inert gas from the supply line 154 is directed to the heating and welding areas.

To water cool the welding apparatus, each of the electric contact blocks 142 is water cooled by suitable water cooling conduits, illustrated in phantom at 166, 167 and 168 in FIG. 5. Moreover, the housing 121 of the welding box 120 may be water cooled as heretofore described in the embodiment of FIGS. 1 to 4 through suitable water conduits illustrated in phantom at 170 and 171 in FIG. 5.

From the above detailed description, the operation of the improved welding apparatus, according to the embodiments of FIGS. 5 to 7, is believed to be clear. However, briefly, the apparatus therein illustrated is a two-stage welding apparatus including a heating stage, comprising electrode holders 123a and 123b supported by the turret member 132 and a welding stage, including electrodes 123c and 123d, carried by the turret member 133. It will be understood, of course, that the principles of the present invention are equally applicable to one-or two-stage heating and/or welding operations and the two-stage operation may be equally applicable to the embodiments of FIGS. 1 to 7; the quick-change electrode features of FIGS. 5 to 7 may be employed to a single stage welding apparatus. To provide for the rapid movement of an electrode 160 into and out of welding position, each of the turrets 132 and 133 is slidably mounted in the housing 121 of the welding apparatus and carries a pair of electrodes supported by a respective one of a pair of electrode holders. Each of the turrets 132 and 133 is slidably movable between two positions wherein one of the electrodes is supported in the welding position while the other of the electrodes is out of welding position and out of electrical engagement with the electrical circuit, while in the second of the positions for the turrets 132 and 133 the respective positions of the electrodes are reversed. In other words, with reference to FIG. 6, in the illustrated position of the turret 132, the electrode holder 123a supports the electrode 160 in welding position with reference to the tube 130 while the electrode holder 123b is out of welding position; however, when the turret 134 is moved to the left until the stop 141 engages the right-hand wall of the housing 121, the electrode 160 carried by the electrode holder 123b will then be in welding position with reference to the tube 130 while the other electrode 160 carried by the electrode holder 123a will be out of welding position. Moreover, it will be understood that when the electrode is out of the welding position, it is isolated electrically from the electrical circuit and, additionally, it is disconnected from the inert gas supply. When thus removed from the welding position, the electrode 160 may be adjusted or replaced and, as a matter of fact, the entire electrode holder 123 may be removed and replaced if necessary.

In accordance with the embodiment of FIGS. 5 to 7, an electrode 160 may be rapidly moved into welding position in a minimum of time so that the amount of tubing 130 that passes through the welding box 120 during the transition from one electrode to the other is reduced and, accordingly, the waste in the tube 130 which occurs by failure to weld the seam thereof during transition of one electrode to the other is minimized.

While there have been illustrated and described particular embodiments of the present invention, it will be appreciated that numerous changes and modifications will occur to those skilled in the art, and it is intended in the appended claims to cover all such changes and modifications as fall within the true spirit and scope of the invention.

What is claimed as new and is desired to be secured by Letters Patent of the United States is:

1. A welding apparatus for use in closing the seam in seamed tubing, comprising a housing defining a welding chamber within which a welding operation utilizing an inert gas-shielded arc is performed to close said seam, passageway means including aligned openings in opposed walls of said chamber through which a continuous length of said tubing may be moved, an electrode holder sleeve extending through said housing, an electrode holder including a welding electrode slidably extending through said sleeve in electric isolation therewith into said chamber, means for rapidly bringing said welding electrode into and out of welding position by the mere insertion and withdrawal thereof through said sleeve, means automatically connecting electric welding current to said electrode when it is in said welding position, and means for automatically supplying inert gas through said electrode holder to the welding area when said electrode is in said welding position.

2. A welding apparatus for use in closing the seam in seamed tubing, comprising a housing defining a welding chamber within which a welding operation utilizing an inert gas-shielded arc is performed to close said seam, passageway means including aligned openings in opposed walls of said chamber through which a continuous length of said tubing may be moved, a plurality of electrode holders each adapted to carry a welding electrode for extension through said housing in electrical isolation therewith into said chamber, means for selectively bringing said electrode holders into welding position, means automatically connecting electric welding current to said electrode holder when it is in said welding position, and means for automatically supplying inert gas through said electrode holder to the welding area when said electrode is in said welding position.

3. A welding apparatus as set forth in claim 2 above wherein said last mentioned means includes passageway means in said electrode holders and passageway means in said housing adapted to be connected to a gas supply source, the passageway means of each selected electrode holder being in communication with the passageway means in said housing when said selected electrode holder is in said welding position.

4. A welding apparatus as set forth in claim 2 above and additionally including a contact block electrically carrying each selected electrode holder and connected electrically with a source of welding current at least when the selected one of said electrode holders is in a welding position.

5. A welding apparatus as set forth in claim 2 above and additionally including turret means carrying said plurality of electrode holders adapted to selectively move one of said electrode holders into said welding position.

6. A welding apparatus as set forth in claim 2 above and including sleeve means carried by said housing in electrical isolation therewith for slidably receiving an electrode holder, and wherein each of said electrode holders is provided with a cylindrical portion having a finished outer surface slidably receivable in said sleeve means so that said electrode holders may be removed from and selectively assembled with said housing by the mere insertion of the selected electrode holder into said sleeve.

7. A welding apparatus for use in closing the seam in seamed tubing, comprising a housing defining a welding chamber within which a welding operation utilizing an inert gas-shielded arc is performed to close said seam, passageway means including aligned openings in opposed walls of said chamber through which a continuous length of said tubing may be moved, a turret member carried by said housing and including a pair of electrode holder blocks of electrically conducting material in electrical isolation with each other and with said housing, two electrode holders carried by respective ones of said blocks each adapted to carry a welding electrode for extension through said housing in electrical isolation therewith into said chamber, means for moving said turret to selectively bring one of said electrode holders into welding position while simultaneously moving the other of said electrode holders out of welding position, means automatically connecting electric welding current to said one of said electrode holders in said welding position, and means for automatically supplying inert gas through said one of said electrode holders to the welding area.

8. A welding apparatus for use in closing the seam in seamed tubing, comprising a housing defining a welding chamber within which a welding operation utilizing an inert gas-shielded arc is performed to close said seam, passageway means including aligned openings in opposed walls of said chamber through which a continuous length of said tubing may be moved, a plurality of electrode holders each adapted to carry a welding electrode for extension through said housing in electrical isolation therewith into said chamber, means for selectively bringing a plurality of said electrode holders into simultaneously electric arcing positions with said tubing, means automatically connecting electric current to said electrode holders when they are in said arcing positions to first heat and then subsequently weld said tubing, and means for automatically supplying inert gas through each of said electrode holders in said arcing positions.

9. A welding apparatus for use in closing the seam in seamed tubing, comprising a housing defining a welding chamber within which a welding operation utilizing an inert gas-shielded arc is performed to close said seam; passageway means including aligned openings in opposed walls of said chamber through which a continuous length of tubing may be moved; an elongated electric contact block extending in sealed electrical isolation into said chamber and provided with a threaded aperture aligned with an aperture in said housing; an adjustable sleeve having a plurality of radial openings through its walls threadedly received in said aperture; means for supplying an inert gas and including means interconnecting said radial openings with means through said contact block adapted to be connected to a source of supply gas throughout the adjustable travel of said sleeve; a plurality of electrode holders each having a positioning sleeve provided with a finished outer surface, and each selectively slidably receivable by mere insertion thereof in said adjustable sleeve in sealed relation with said chamber and including means communicable with said radial openings in said adjustable sleeve; said electrode holders each including a collet positioned within said last-mentioned sleeves for supporting electrodes and provided with gas passageway means communicable with said last-mentioned means whereby inert gas may be supplied to the welding area through the selected one of said electrode holders; and means including said contact block, adjustable sleeve, and positioning sleeve and collet of the selected electrode holder for supplying electric welding current to the one of said electrodes supported by the selected one of said electrode holders.

References Cited by the Examiner

UNITED STATES PATENTS

| | | |
|---|---|---|
| 2,139,771 | Riemenschneider | Dec. 13, 1938 |
| 2,179,176 | Dunn | Nov. 7, 1939 |
| 2,788,430 | Oakley | Apr. 9, 1957 |
| 3,007,032 | Whiteman | Oct. 31, 1961 |
| 3,047,715 | Pilia | July 31, 1962 |

FOREIGN PATENTS

| | | |
|---|---|---|
| 827,044 | Great Britain | Feb. 3, 1960 |